US007800845B2

(12) United States Patent  (10) Patent No.: US 7,800,845 B2
Mansfield  (45) Date of Patent: Sep. 21, 2010

(54) SUPPORT FOR VIBRATING OPTICAL ASSEMBLY

(75) Inventor: James C. Mansfield, Hillsboro, OR (US)

(73) Assignee: Hinds Instruments, Inc., Hillsboro, OR (US)

( * ) Notice: Subject to any disclaimer, the term of this patent is extended or adjusted under 35 U.S.C. 154(b) by 884 days.

(21) Appl. No.: 11/420,650

(22) Filed: May 26, 2006

(65) Prior Publication Data
US 2008/0001055 A1  Jan. 3, 2008

(51) Int. Cl.
G02B 7/02 (2006.01)
(52) U.S. Cl. .................. 359/811; 359/813; 359/814
(58) Field of Classification Search ............. 359/811, 359/813, 814, 819, 823, 824, 827, 829
See application file for complete search history.

(56) References Cited
U.S. PATENT DOCUMENTS

| 1,814,843 | A |   | 4/1931  | Narath |
| 1,845,551 | A |   | 2/1932  | Mitzl |
| 1,873,834 | A |   | 8/1932  | Fleckenstein |
| 2,100,836 | A |   | 11/1937 | Clothier |
| 3,115,323 | A |   | 12/1963 | Crandell |
| 3,495,912 | A |   | 2/1970  | Hooper |
| 3,582,920 | A |   | 6/1971  | Billawala |
| 3,824,000 | A |   | 7/1974  | Burns |
| 3,867,014 | A |   | 2/1975  | Kemp |
| 3,938,255 | A | * | 2/1976  | Lichte, Jr. ............... 33/311 |
| 4,101,008 | A |   | 7/1978  | Frosch |
| 4,215,915 | A |   | 8/1980  | Freiberg |
| 4,466,295 | A |   | 8/1984  | Wesson |
| 4,519,252 | A |   | 5/1985  | McMahon |
| 4,973,163 | A |   | 11/1990 | Sakai |
| 5,177,555 | A |   | 1/1993  | Stratton |
| 5,408,355 | A |   | 4/1995  | Rauch |
| 5,493,623 | A |   | 2/1996  | Frische |
| 5,588,632 | A |   | 12/1996 | Solomon |
| 5,645,262 | A |   | 7/1997  | Hamlin |
| 5,886,810 | A |   | 3/1999  | Siahpoushan |
| 6,906,844 | B1 |  | 6/2005  | Siahpoushan |
| 2004/0232306 | A1 |   | 11/2004 | Vatsaas et al. |
| 2004/0252947 | A1 |   | 12/2004 | Liu |
| 2006/0119218 | A1 | * | 6/2006  | Doshida et al. ........ 310/323.01 |

FOREIGN PATENT DOCUMENTS

WO  WO8606505  11/1986

OTHER PUBLICATIONS

International Search Report and Written Opinion of ISA, Mar. 3, 2008, 7 pages re corresponding PCT app US07/69675.
Canit & Badoz, New Design for a Photoelastic Modulator, Applied Optics, Feb. 15, 1983, 3 pages, vol. 22, No. 4.
International Preliminary Report on Patentability, Dec. 11, 2008, 5 pages; re corresponding PCT app. US07/069675.

* cited by examiner

Primary Examiner—Timothy J Thompson
(74) Attorney, Agent, or Firm—Hancock Hughey LLP

(57) ABSTRACT

A support for a vibrating component of an optical assembly that is adjacent to a frame includes an elastomeric rod having one end that is attachable to the component. A rigid sleeve is fastened to the frame and movable relative to the frame. The sleeve has a bore that opens to an inner end of the sleeve and is sized to receive the free end of the rod therein.

20 Claims, 2 Drawing Sheets

SUPPORT FOR VIBRATING OPTICAL ASSEMBLY

FIELD OF THE INVENTION

This invention relates to a way of supporting a vibrating optical assembly.

BACKGROUND OF THE INVENTION

A photoelastic modulator (PEM) is an instrument that is used for modulating the polarization of a beam of light. A PEM employs the photoelastic effect as a principle of operation. The term "photoelastic effect" means that an optical element that is mechanically stressed and strained (deformed) exhibits birefringence that is proportional to the amount of deformation induced into the element. Birefringence means that the refractive index of the element is different for different components of a beam of polarized light.

A PEM includes an optical element, such as fused silica, that has attached to it one or more transducers for vibrating the optical element at a fixed frequency within, for example, the low-frequency, ultrasound range of about 20 kHz to 100 kHz. The mass of the element is compressed and extended as a result of the vibration. The combination of the optical element and the attached transducer(s) may be referred to as an optical assembly.

The compression and extension of the optical element imparts oscillating birefringence characteristics into the optical element. The frequency of this oscillating birefringence is determined by the size of the optical element and the speed of the transducer-generated vibration or sound wave through the material that comprises the optical element.

The effect of the oscillating birefringence of the PEM on a linear-polarized monochromatic light wave is to vary over time the phase difference between the orthogonal components of the light that propagates through the optical element. This phase difference is known as retardation or retardance and can be measured in terms of length, waves (for example, quarter-wave, half-wave), or phase angle. There are many scientific and commercial applications for which such modulated light is employed.

The optical assembly is contained within a housing or enclosure that includes an optical aperture through which the light under study is directed through the optical element. The enclosure supports the optical assembly in a manner that permits the optical element to be driven (vibrated) within the enclosure to achieve the above-noted photoelastic effect.

It is desirable to maximize the overall performance quality factor, or "Q" value, of the photoelastic modulator. In this regard, "Q" is defined as the ratio of the energy stored in a system to the energy lost per cycle. The higher the "Q," the more efficient the system.

If an optical assembly is secured in the enclosure with somewhat rigid mounting mechanisms, the effect is to dampen the vibration of the optical element, thus requiring more drive energy to maintain the desired vibration frequency of the element. Increasing drive energy increases the heat generated within the photoelastic modulator, which causes a reduction in the Q value. Nonetheless, the optical assembly must be securely supported in a manner such that, apart from the vibration of the assembly, the optical assembly remains in a fixed position relative to the enclosure and optical aperture.

Moreover, the optical assembly should be supported in a way that permits vibration of the assembly without introducing any significant stress or strain on the optical element, which would affect the oscillating birefringence characteristics of the element.

The present invention provides an effective support for a vibrating member such as the optical assembly of a PEM. The support permits free vibration of the optical assembly with a high "Q" factor. Moreover, the support described here facilitates accurate and rapid assembly of the components of the optical assembly and enclosure.

DETAILED DESCRIPTION OF ONE EMBODIMENT

Figure 1:
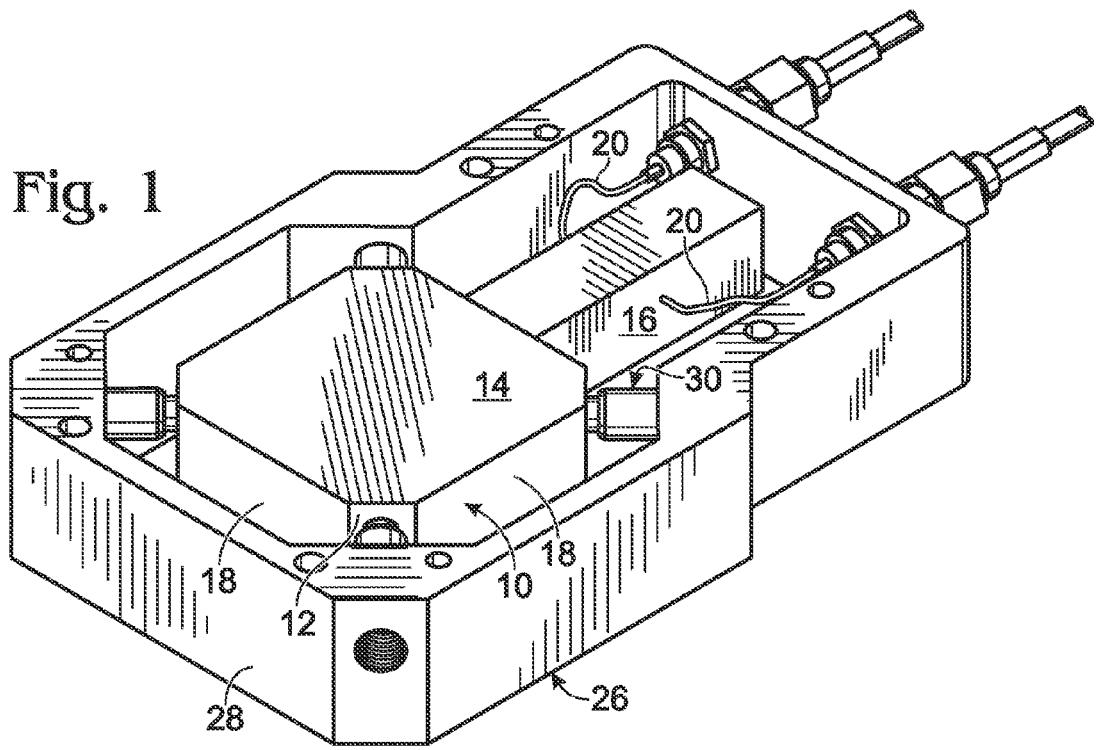
FIG. 1 is a perspective view showing components of an optical assembly that employs an embodiment of the support of the present invention.

FIG. 1 depicts the primary components of a photoelastic modulator, including an optical element 10 formed of fused silica. Other material, such as fused quartz, calcium fluoride, zinc selenide, silicon and others may be used to form the optical element.

The optical element 10 is a generally square-shaped member but having beveled corners that define flat support surfaces 12, to which the supports of the present invention may be attached as described below. The optical element also has an entry surface 14 (FIGS. 1 and 2) against which an incident light wave is directed while the photoelastic modulator is operating.

A quartz piezoelectric transducer 16 is bonded to one of the four sides 18 of the optical element 10. Electrical leads 20 from the transducer are connected to a driver circuit (not shown) for vibrating the optical element 10. The driver circuit may be tuned to drive the optical element 10 to vibrate at its natural resonant frequency, which might be, for example, about 84 kHz.

Figure 2:
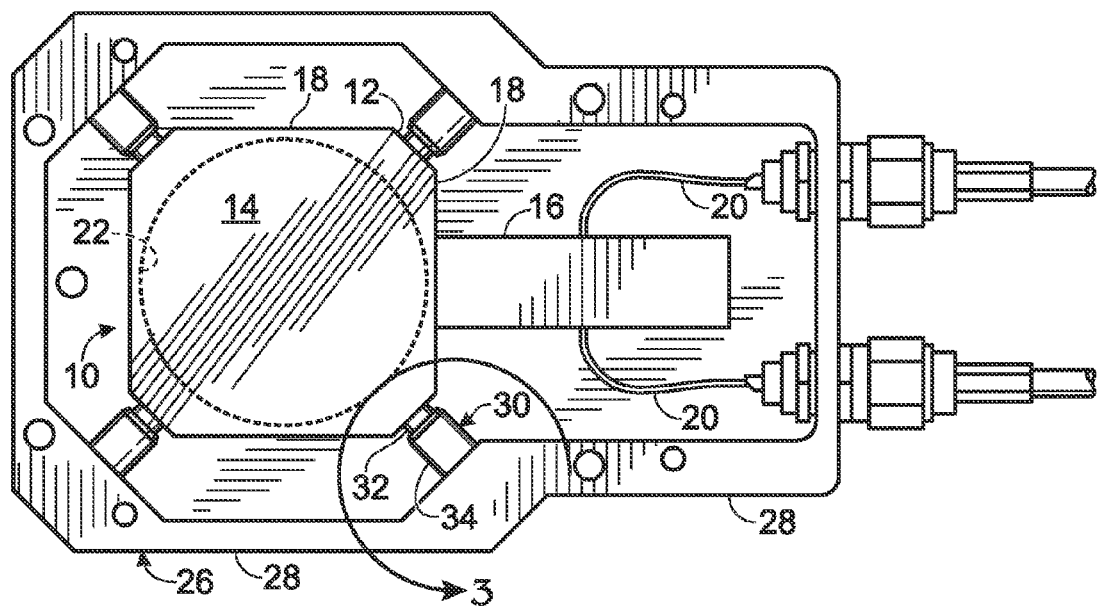
FIG. 2 is a top view of the assembly of FIG. 1.

The optical element 10 and transducer 16 (hereafter collectively referred to as the optical assembly) are contained within a housing or enclosure, a portion of which is shown in FIGS. 1 and 2. The enclosure includes a bottom part 26 that is formed from rigid material such as metal to define a tray shape. (It is noteworthy here that the terms "top" or "bottom" are intended to designate components for illustrative purposes, and not suggest that such components are limited to a particular orientation in space.) The bottom part 26 includes a frame 28 that essentially surrounds the optical element 10 and attached transducer 16.

The enclosure includes an optical aperture 22 (FIG. 2) through which light is directed to propagate through the vibrating optical element 10. The light that emanates from the element 10 is then detected and analyzed. The bottom part 26 of the enclosure is covered with a thin rigid plate (not shown) that includes a corresponding, aligned optical aperture.

The optical assembly is housed within the enclosure so that it is free to vibrate when driven as described above. In this regard, and in accordance with the present invention, the optical assembly is mounted to the frame 28 by supports 30 that secure the optical element to be substantially suspended within the frame.

Figure 3:
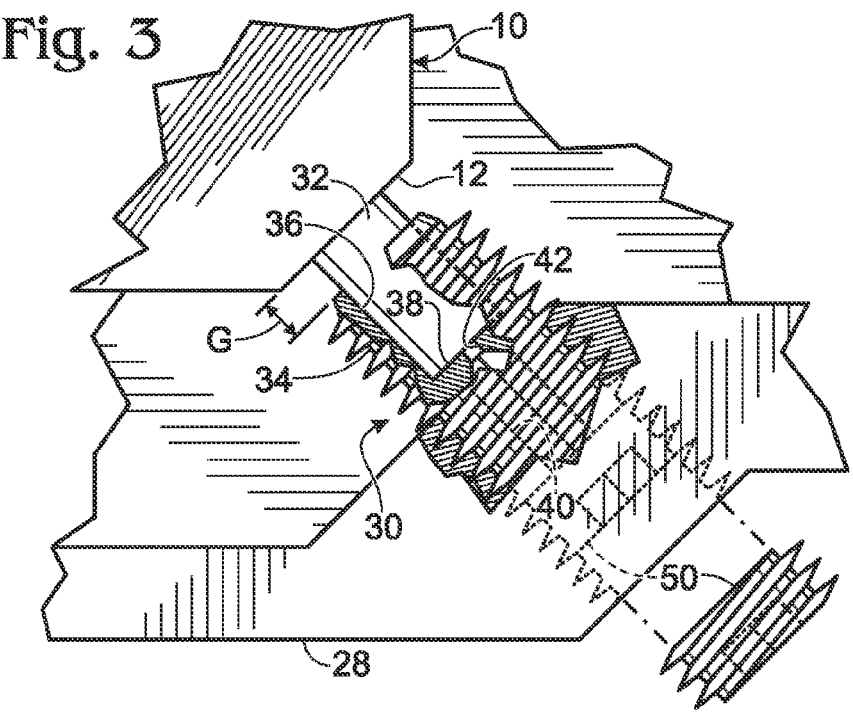
FIG. 3 is an enlarged, detail view taken from FIG. 2.

This description here turns to a discussion of an exemplary one of the supports 30 of the present invention with the understanding that a number of such supports are used to support the overall assembly. As best shown in FIGS. 2 and 3, a support 30 of the present invention includes an elastomeric rod 32 that may be formed, for example, from extruded silicone (polysiloxane) cords that are cut to a specified length to define the rod 32.

One of the two, flat ends of the rod 32 is attached, as by an adhesive, to one of the support surfaces 12 on the optical element 10. The other, free end of the rod 32 fits within a sleeve 34 that is carried by the frame 28. Specifically, the sleeve 34 may be a rigid, threaded member having a cylindrical, axial bore 36 formed through one (inner) end of the sleeve 34 and extending more than half-way through the sleeve. A relatively smaller-diameter (as compared to the diameter of bore 36) opening 40 is tapped into the other (outer) end of the sleeve 36 and opens (at 42, FIG. 3) to the bore. At the junction of the bore 36 and opening 40 there is defined an internal, annular shoulder 38 that faces the free end of the rod 32 that fits into the bore.

To mount the optical element 10 to the frame 28 using the support 30, the optical element with attached rod 32 is held in the desired location within the enclosure (that is, spaced from the frame 28 and aligned with the above mentioned optical aperture 22). The sleeve 34 is rotated within its threaded aperture to advance the sleeve 32 toward the rod such that the free end of the rod slides into the bore 36 of the sleeve 34. In this regard, the diameter of the rod 32 is only slightly smaller than that of the bore so that the rod slides into the bore in contact with the wall of the bore. Alternatively, the rod has a slightly larger diameter than that of the bore, but is slightly compressed by an amount sufficient to allow the rod to slide into the bore in contact with the wall of the bore (that is, with no significant space between the curved sides of the rod and the curved bore wall).

The sleeve 34 is advanced until the free end of the rod 32 is completely received within the bore 36 of the sleeve. In this regard, the end of the rod 32 will, preferably, abut the shoulder 38 at the end of the bore, or be very close to that shoulder.

One assembling the support as just described, will rotate the sleeve 34 until the presence of the rod 32 against the shoulder 38 is discerned by touch. Alternatively, or in addition thereto, the end of the rod 32 may be viewed through the opening 40 in the outer end of the sleeve 34 to confirm that the rod is sufficiently seated within the bore 36 of the sleeve. No adhesives are required for attaching the free end of the rod to the sleeve.

The sleeve 34 may be advanced by hand or with a tool. In this regard, the opening 40 in the outer end of the sleeve 34 may be shaped to define a socket for an Allen-type wrench or the like. Once the sleeve is advanced to completely receive the free end of the rod 32 in the bore 36, a set screw 50 is threaded into the frame behind the sleeve 34 (see FIG. 3) and to bear against the outer end of the sleeve to lock the sleeve in place so that the sleeve does not back out of its aperture during use of the optical assembly. The sleeve 34 could be locked in place by other means, such as thread-bonding agents.

It will be appreciated that any of a variety of sizes may be selected for the rod 32 and sleeve 34 components of the support 30. Preferably, however, the length of the rod 32 and depth of the bore 36 will be selected so that most of the rod is within the bore and only a relatively short, exposed portion of the rod is present between the support surface 12 of the optical element and the inner end of the sleeve 34, the length of that portion being shown as a gap of dimension "G" in FIG. 3. Preferably the gap "G" is equal to or less than the diameter of the rod.

As depicted in FIG. 2, four supports are employed to secure the optical element 10 in place relative to the frame 28. The supports are arranged in diametrically opposed pairs. The transducer 16, in this embodiment, is attached to the optical element 10, and not otherwise supported by the frame 28.

Figure 4:
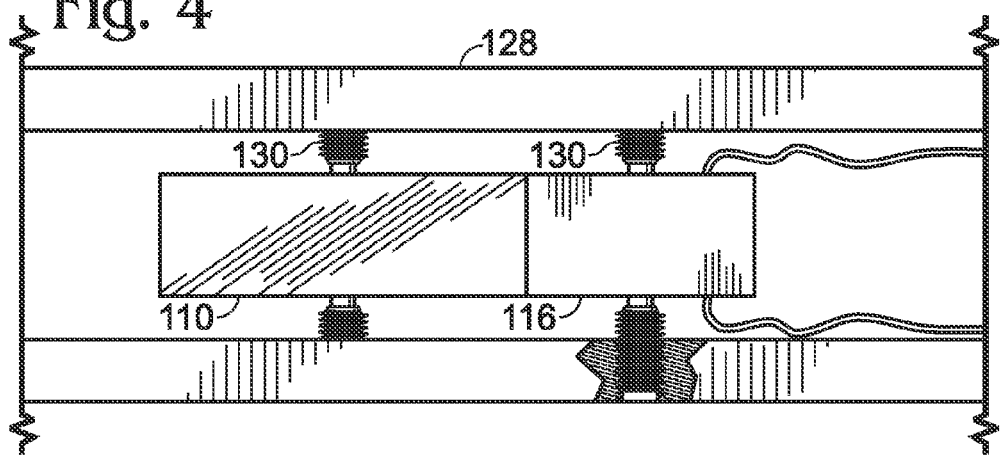
FIG. 4 is a top view of components of another optical assembly that employs an embodiment of the support of the present invention.

FIG. 4 illustrates another configuration of an optical assembly whereby the optical element 110 is an elongated, bar shaped member to which is bonded a single transducer 116. In this embodiment, supports 130 matching the supports 30 described above are used to support the optical element 110 and transducer 116 within the frame 128. Two supports 130 are connected between the frame 128 and optical element 110, and two supports 130 are connected between the frame 128 and transducer 116. Each of the supports 130 is located at the respective centers of the length of the optical element 110 and transducer 116 where a vibrational node point exists while the optical assembly is driven.

Figure 5:
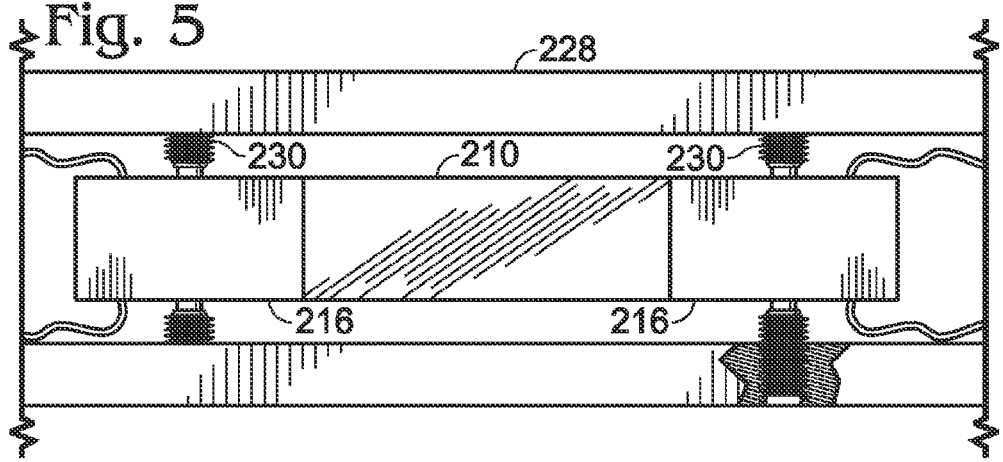
FIG. 5 is a top view of components of yet another optical assembly that employs an embodiment of the support of the present invention.

FIG. 5 illustrates another version of an optical assembly where an optical element 210 is bonded between two transducers 216 but not otherwise supported by connection to the surrounding frame 228. Each transducer 216 is supported with a pair of opposed supports 230 matching the supports 30 described above and extending between the frame 228 and transducer 216.

The embodiments illustrated and described above are not intended to be exhaustive or limit the invention to the precise form disclosed. For example, although the rod and bore described above have a generally circular cross-section, it is contemplated that other cross sectional shapes (square, triangular etc.).

The invention claimed is:

1. A support for a vibrating component of an optical assembly that is adjacent to a frame, comprising:
   an elastomeric rod having first and second ends, the first end being attachable to the component;
   a frame; and
   a rigid sleeve fastened to the frame and movable relative to the frame, the sleeve having a bore that opens to an inner end of the sleeve and is sized to receive the second end of the rod therein.

2. The support of claim 1 wherein the sleeve is threaded into an aperture in the frame and thus rotatable for movement relative to the frame.

3. The support of claim 2 including a set screw threaded into the aperture and against an outer end of the sleeve thereby to secure the sleeve against movement away from the rod.

4. The support of claim 2 wherein the bore extends partly through the sleeve, thereby defining within the sleeve a shoulder to limit the depth to which the second end of the rod is completely received within the bore.

5. The support of claim 4 wherein the length of the rod is selected so that there will be a gap between the inner end of the sleeve and the first end of the rod when the rod is completely received within the bore.

6. The support of claim 5 wherein the gap is less than the diameter of the rod.

7. The support of claim 4 further comprising an opening in an outer end of the sleeve opposite to the inner end of the sleeve, the opening joining the bore.

8. The support of claim 7 wherein the opening defines a socket for receiving a tool for threading the sleeve in the frame aperture.

9. The support of claim 1 further comprising locking means for securing the sleeve in place relative to the frame.

10. The support of claim 1 wherein the rod and bore are cylindrical and the diameter of the bore substantially conforms to the diameter of the rod to permit the rod to slide into the bore.

11. The support of claim 1 wherein the second end of the rod is received within the bore of the sleeve and retained therein without being attached to the sleeve.

12. An optical assembly supported in a frame comprising:

an optical element;

a frame;

supports extending between the optical element and the frame at spaced-apart locations, each support comprising:

an elastomeric rod having first and second ends, the first end being attached to the optical element;

a rigid sleeve fastened to the frame and movable relative to the frame, the sleeve having a bore that is sized to receive the second end of the rod; and a transducer attached to the optical element and operable for vibrating the optical element.

13. The assembly of claim 12 wherein the transducer is supported by the frame using two supports that are configured as described in claim 12.

14. The assembly of claim 12 comprising four supports, the supports being arranged so that at least two of the four supports are opposite each other.

15. A method of supporting a vibrating component of an optical assembly adjacent to a frame, comprising the steps of:

attaching one end of an elastomeric rod to the component;

moving a sleeve that is carried on the frame until a length of the rod is received within a bore of the sleeve; and locking the sleeve in position relative to the frame.

16. The method of claim 15 wherein the moving step includes locating a second end of the rod so that it abuts a shoulder in the sleeve.

17. The method of claim 16 including the step of selecting the length of the rod so that there is an exposed part of the rod between the sleeve and the component when the second end of the rod abuts the shoulder in the sleeve.

18. The method of claim 17 wherein the rod is cylindrical and the step of selecting the rod is such that the length of the exposed part of the rod is less than or equal to the diameter of the rod.

19. The method of claim 15 including the step of sizing the rod to slide into the bore and fit therein without the need for otherwise attaching the rod to the sleeve.

20. The method of claim 15 wherein the step of moving the sleeve comprises threading the sleeve within an aperture in the frame.

\* \* \* \* \*